(12) United States Patent
Shiga et al.

(10) Patent No.: US 7,511,740 B2
(45) Date of Patent: Mar. 31, 2009

(54) DIGITAL CAMERA

(75) Inventors: Akira Shiga, Kanagawa (JP); Toshinori Orito, Kanagawa (JP)

(73) Assignee: Sony Corporation, Tokyo (JP)

( * ) Notice: Subject to any disclaimer, the term of this patent is extended or adjusted under 35 U.S.C. 154(b) by 830 days.

(21) Appl. No.: 10/496,006

(22) PCT Filed: Sep. 25, 2003

(86) PCT No.: PCT/JP03/12235

§ 371 (c)(1),
(2), (4) Date: Oct. 8, 2004

(87) PCT Pub. No.: WO2004/032488

PCT Pub. Date: Apr. 15, 2004

(65) Prior Publication Data
US 2005/0062874 A1    Mar. 24, 2005

(30) Foreign Application Priority Data
Oct. 4, 2002    (JP) .............................. 2002-292094

(51) Int. Cl.
*H04N 5/235*    (2006.01)
(52) U.S. Cl. ..................... 348/229.1; 348/362
(58) Field of Classification Search ............ 348/221.1, 348/224.1, 227.1, 234, 296, 363–364
See application file for complete search history.

(56) References Cited

U.S. PATENT DOCUMENTS 5,212,557 A * 5/1993 Ueda .......................... 348/347
5,559,555 A * 9/1996 Shimizu et al. ............. 348/364
5,831,676 A * 11/1998 Takahashi et al. ........... 348/362
6,707,500 B1 * 3/2004 Tamura et al. .............. 348/362
6,747,704 B1 * 6/2004 Kitamura .................... 348/363

FOREIGN PATENT DOCUMENTS

| JP | 59-194574 | 11/1984 |
| JP | 5-145835 | 6/1993 |
| JP | 11-249194 | 9/1999 |
| JP | 2000-69356 | 3/2000 |
| JP | 2002-330334 | 11/2002 |

* cited by examiner

*Primary Examiner*—David L Ometz
*Assistant Examiner*—Luong T Nguyen
(74) *Attorney, Agent, or Firm*—Oblon, Spivak, McClelland, Maier & Neustadt, P.C.

(57) ABSTRACT

A digital camera with reduced shutter lag and improved exposure accuracy, and including image pickup lens optics, an iris, an image pickup, a hold/gain control circuit, a luminance level detector, an exposure control circuit, and a control circuit. The exposure control circuit discriminates, based on a luminance level supplied from the luminance level detector, whether or not appropriate exposure is performed. Then, based on the discrimination result, the exposure control circuit arithmetically operates three values of numerical aperture of the iris, shutter speed of an electronic shutter of the image pickup, and gain of the hold/gain control circuit, which are necessary for appropriate exposure. The exposure control circuit arithmetically operates iris control data, electronic shutter control data, and gain control data necessary for the arithmetically operated exposure amounts to be individually reflected on the iris, the electronic shutter of the image pickup, and the hold/gain control circuit.

4 Claims, 4 Drawing Sheets

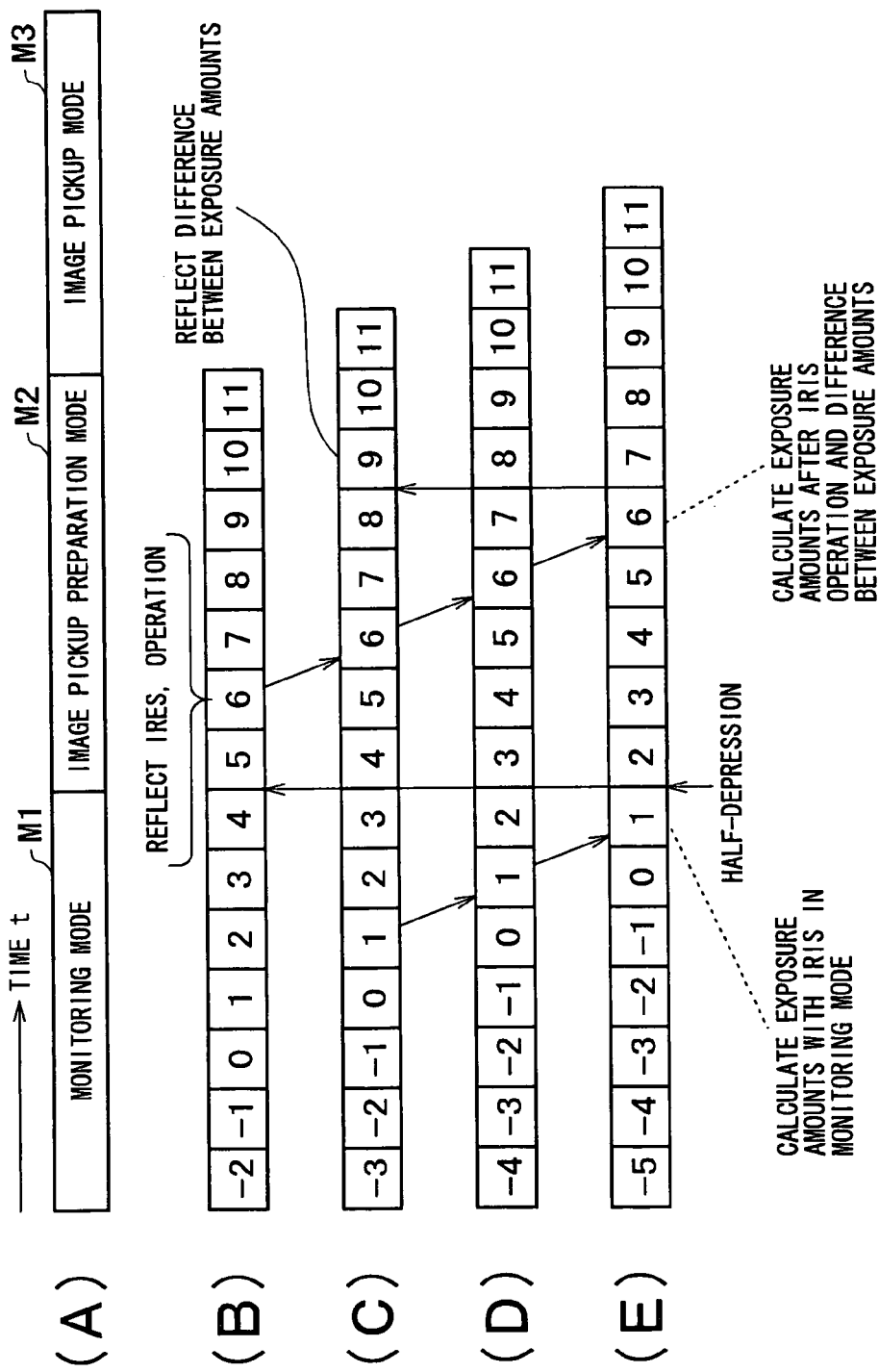

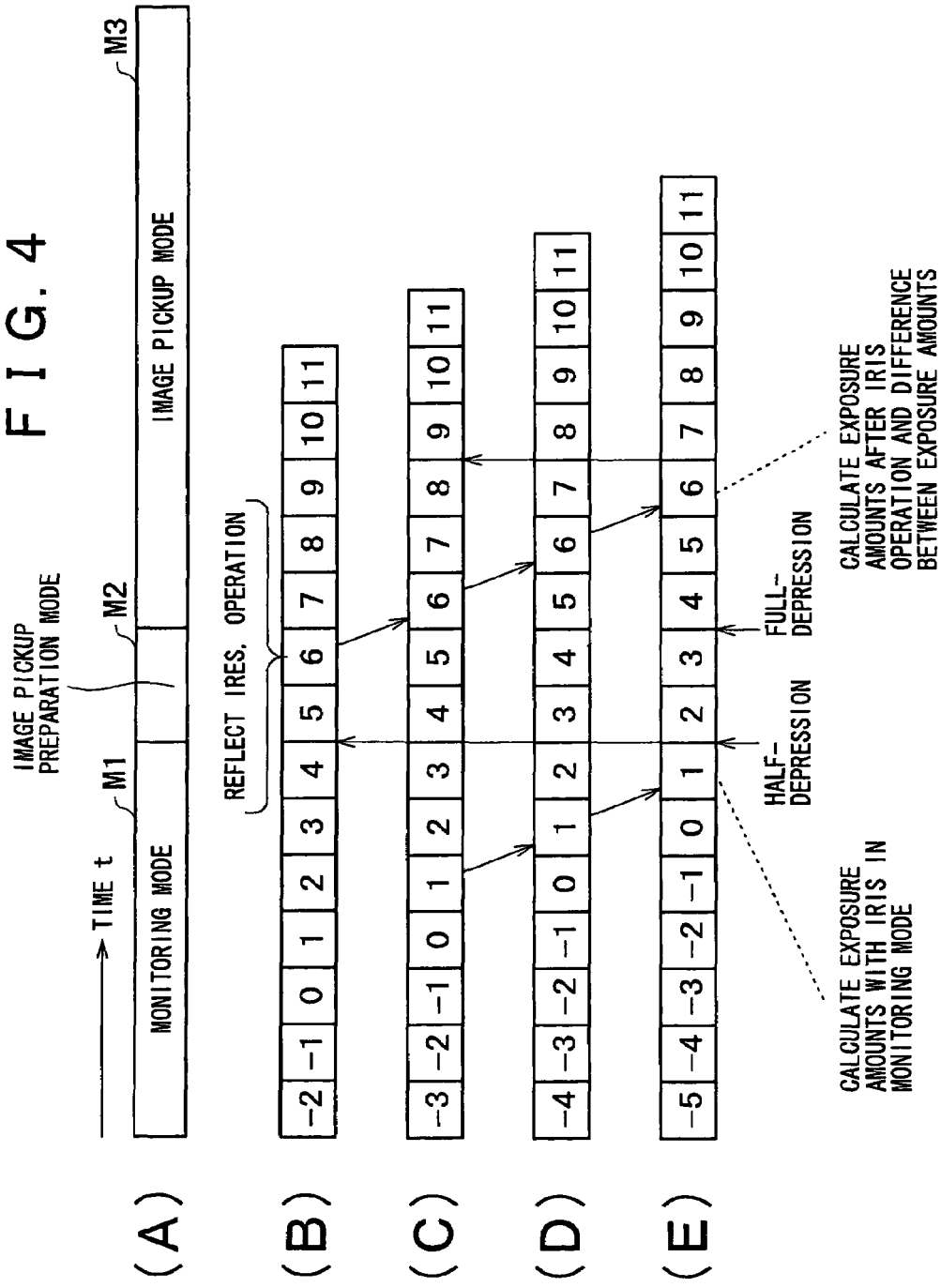

DIGITAL CAMERA

TECHNICAL FIELD

This invention relates to a digital camera.

BACKGROUND ART

Conventionally, a digital camera is known which makes use of an output of a solid-state image pickup device to perform automatic exposure control, that is, to perform so-called imager AE.

For example, a digital camera is disclosed which includes an iris for controlling the amount of light to be admitted into a solid-state image pickup device and an image amplifier to which an image signal from the solid-state image pickup device is supplied and which assures the lowest image pickup subject illuminance of an average output level of the solid-state image pickup device irrespective of a variation of the iris (Japanese Patent Laid-open No. Hei 5-236338). In a digital camera of the type described above, an iris value is detected to correct the gain of the image amplifier.

In this manner, in a digital camera, the numerical aperture of the iris and the gain of the image signal are controlled to perform exposure control. Further, also by controlling the electronic shutter amount (shutter speed) of the image pickup device, exposure control can be performed similarly.

Incidentally, the operation mode of a digital camera upon image pickup successively changes to a monitoring mode, an image pickup preparation mode and an image pickup mode.

In particular, the monitoring mode is a mode in which, before the shutter button is depressed, an image of an image pickup subject is displayed on the display section in order to determine an image pickup range or composition. The numerical aperture of the iris in the monitoring mode is set to a value with which no smear occurs with the image pickup device.

The image pickup preparation mode is a state wherein the shutter button is half-depressed and a mode in which the three values of the numerical aperture of the iris, the electronic shutter amount and the gain of the image pickup signal are calculated and set based on the image pickup signal. In the image pickup preparation mode, the iris is driven so that the set numerical aperture may be established.

The image pickup mode is a state wherein the shutter button is depressed fully and a mode in which the electronic shutter of the image pickup device operates in a state wherein the opening of the iris, the electronic shutter amount and the gain of the image pickup signal all set in the image pickup preparation mode are established, and the image pickup signal is outputted from the image pickup device and image data are written into a memory.

In the conventional digital camera having such a configuration as described above, since the iris is formed as a mechanical element, the numerical aperture of the iris includes a hysteresis error and a dispersion error.

In particular, the hysteresis error is an error which appears, when the numerical aperture of the iris is set to a certain target value, between a numerical aperture in a case wherein the iris operates from the open side toward the smaller numerical aperture side and another numerical aperture in another case wherein the iris operates from the smaller numerical aperture side toward the open side.

Meanwhile, the dispersion error is an error of the numerical aperture of the iris which disperses within a certain range where the numerical aperture of the iris is set to a certain target value.

Therefore, in order to remove the hysteresis error described above, conventionally the iris is operated from one direction without fail such that the iris is set once to the open side after the image pickup mode is entered from the image pickup preparation mode, and then the iris is restricted to the target value.

The conventional digital camera configured so as to remove a hysteresis error of the iris in this manner requires operation time to restrict the iris to a target value after it is set once to the open side in the image pickup mode. Therefore, the conventional digital camera has a drawback that increased time is required, that is, a long shutter lag is involved, until the electronic shutter of the image pickup device operates to perform fetching of an image signal after the shutter button is depressed. Further, the dispersion of the numerical aperture of the iris which occurs when the iris is set to a target value cannot be removed, and this is disadvantageous when it is tried to improve the accuracy in exposure.

The present invention has been made in view of such a situation as described above, and it is an object of the present invention to provide a digital camera which is advantageous when it is tried to reduce the shutter lag and improve the accuracy in exposure.

DISCLOSURE OF INVENTION

In order to attain the object described above, according to the present invention, there is provided a digital camera which includes an image pickup lens optical system, an iris capable of controlling a numerical aperture of a light path of the image pickup lens optical system, an image pickup device for detecting an image pickup subject image formed by the image pickup lens optical system in an interlocking relationship with an operation of an electronic shutter and outputting an image pickup signal, gain control means having a controllable gain for amplifying the image pickup signal, and luminance level detection means for detecting a luminance level based on the image pickup signal, characterized in that the digital camera includes first exposure amount arithmetic operation means for arithmetically operating a numerical aperture of the iris necessary to perform image pickup with appropriate exposure as a first numerical aperture based on the luminance level detected by the luminance level detection means, second exposure amount arithmetic operation means for arithmetically operating another numerical aperture of the iris necessary to perform image pickup with appropriate exposure as a second numerical aperture based on the luminance level detected by the luminance level detection means after the first numerical aperture is set to the iris, third exposure amount arithmetic operation means for arithmetically operating a correction amount for the shutter speed necessary to perform image pickup with appropriate exposure based on a difference between the first numerical aperture and the second numerical aperture, and shutter speed correction means for correcting the shutter speed of the electronic shutter of the image pickup device based on the correction amount for the shutter speed.

Thus, the first numerical aperture necessary to perform image pickup with appropriate exposure is arithmetically operated by the first exposure amount arithmetic operation means based on the luminance level of the image pickup signal outputted from the image pickup device. Then, after the first numerical aperture is set to the iris, the second numerical aperture necessary to perform image pickup with appropriate exposure is arithmetically operated by the second exposure amount arithmetic operation means based on the luminance level detected by the luminance level detection means. Further, the correction amount for the shutter speed necessary to perform image pickup with appropriate exposure is arithmetically operated by the third exposure amount arithmetic operation means based on the difference between the first numerical aperture and the second numerical aperture. Thereafter, the shutter speed of the electronic shutter of the image pickup device is corrected by the shutter speed correction means based on the correction amount for the shutter speed.

Further, according to the present invention, there is provided a digital camera which includes an image pickup lens optical system, an iris capable of controlling a numerical aperture of a light path of the image pickup lens optical system, an image pickup device for detecting an image pickup subject image formed by the image pickup lens optical system in an interlocking relationship with an operation of an electronic shutter and outputting an image pickup signal, gain control means having a controllable gain for amplifying the image pickup signal, and luminance level detection means for detecting a luminance level based on the image pickup signal, characterized in that the digital camera includes first exposure amount arithmetic operation means for arithmetically operating a numerical aperture of the iris necessary to perform image pickup with appropriate exposure as a first numerical aperture based on the luminance level detected by the luminance level detection means, second exposure amount arithmetic operation means for arithmetically operating another numerical aperture of the iris necessary to perform image pickup with appropriate exposure as a second numerical aperture based on the luminance level detected by the luminance level detection means after the first numerical aperture is set to the iris, fourth exposure amount arithmetic operation means for arithmetically operating a correction amount for the gain of the gain control circuit necessary to perform image pickup with appropriate exposure based on a difference between the first numerical aperture and the second numerical aperture, and gain correction means for correcting the gain of the gain control circuit based on the correction amount for the gain of the gain control circuit.

Thus, the first numerical aperture necessary to perform image pickup with appropriate exposure is arithmetically operated by the first exposure amount arithmetic operation means based on the luminance level of the image pickup signal outputted from the image pickup device. Then, after the first numerical aperture is set to the iris, the second numerical aperture necessary to perform image pickup with appropriate exposure is arithmetically operated by the second exposure amount arithmetic operation means based on the luminance level detected by the luminance level detection means. Further, the correction amount for the gain necessary to perform image pickup with appropriate exposure is arithmetically operated by the fourth exposure amount arithmetic operation means based on the difference between the first numerical aperture and the second numerical aperture. Thereafter, the gain of the gain control circuit is corrected based on the correction amount for the gain by the gain correction means.

BRIEF DESCRIPTION OF DRAWINGS

FIG. 3 is a diagrammatic view illustrating operation timings of components of the digital camera; and FIG. 4 is a diagrammatic view illustrating operation timings of components of the digital camera.

BEST MODE FOR CARRYING OUT THE INVENTION

In the following, an embodiment of a digital camera according to the present invention is described in detail with reference to the drawings.

Figure 1:
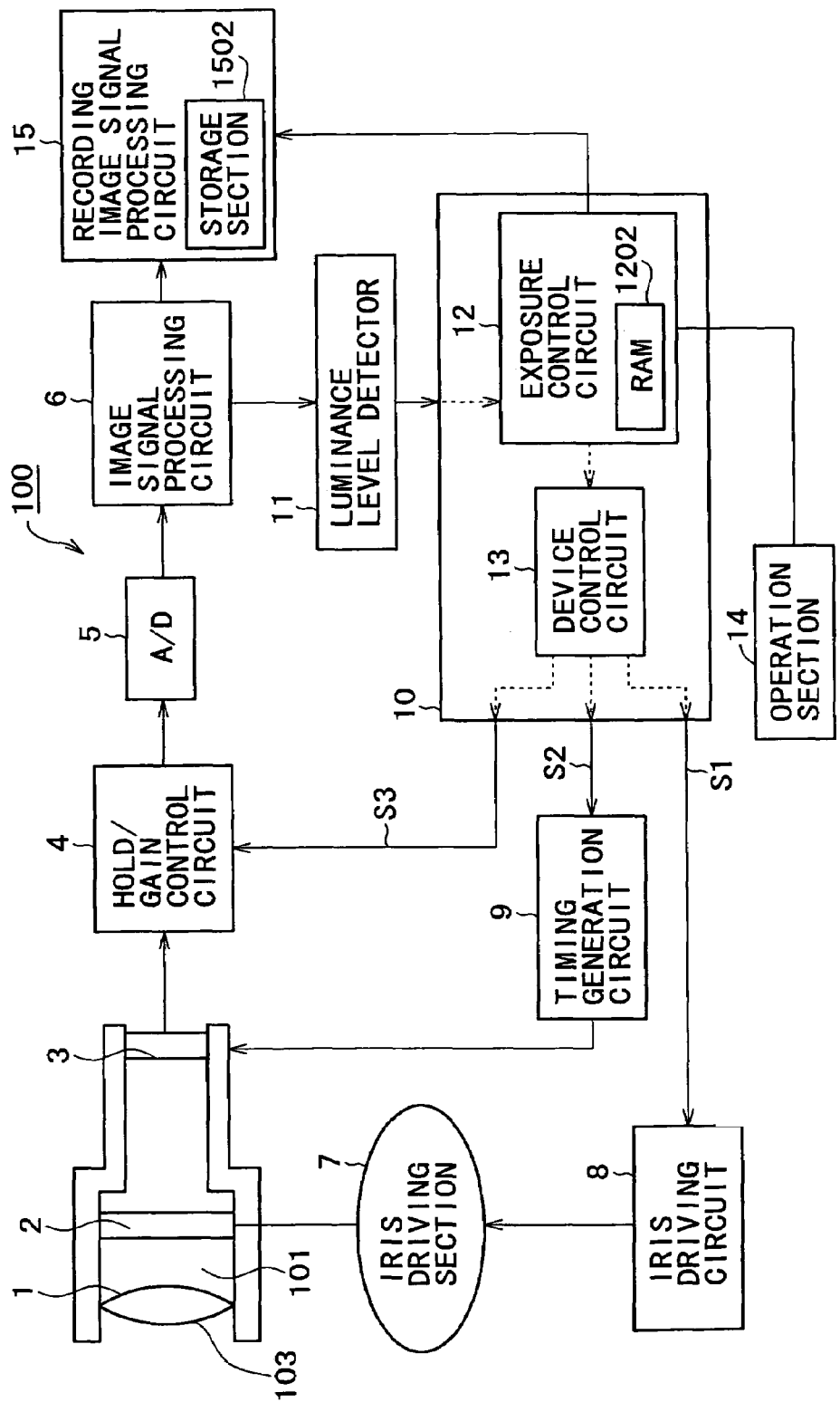
FIG. 1 is a block diagram showing a configuration of a digital camera according to a first embodiment of the present invention.

FIG. 1 is a block diagram showing a configuration of a digital camera according to a first embodiment of the present invention.

The digital camera 100 includes an image pickup lens optical system 1, an iris 2, an image pickup device 3, a hold/gain control circuit 4, an A/D converter 5, an image signal processing circuit 6, an iris driving section 7, an iris driving circuit 8, a timing generation circuit 9, a microcomputer 10, a luminance level detector 11, an exposure control circuit 12, a device control circuit 13, an operation section 14, and a recording image signal processing circuit 15.

The image pickup lens optical system 1 includes a light path 101 for introducing an image of an image pickup subject and an image pickup lens 103 for forming an image of the image pickup subject.

The iris 2 is disposed on the light path 101. The numerical aperture of the light path 101 through which light having passed through the image pickup lens optical system 1 passes is controlled based on an iris driving signal inputted to the iris 2. Thus, the aperture varies mechanically similarly as in the related art.

It is to be noted that the iris 2 may naturally be of a form wherein an ND filter is provided at a location of the member which forms the aperture.

The image pickup device 3 is configured such that it detects an image pickup subject formed by the image pickup lens optical system 1 to produce and output an image pickup signals as an analog signal. In the present embodiment, the image pickup device 3 is formed from, for example, a CCD (Charge Coupled Device) unit, a CMOS (Complementary Metal-Oxide Semiconductor) unit or the like The image pickup device 3 includes an electronic shutter provided therein and performs detection of the image pickup subject for a period of time according to the shutter speed of the electronic shutter to produce the image pickup signal.

The hold/gain control circuit 4 is configured so as to perform sample holding and gain control of the image pickup signal as an analog signal outputted from the image pickup device 3. In particular, the hold/gain control circuit 4 performs amplification of the image pickup signal based on the gain set by the hold/gain control circuit 4.

The A/D converter 5 is configured so as to convert the gain-controlled image pickup signal outputted from the hold/gain control circuit 4 from an analog signal into a digital signal.

The image signal processing circuit 6 performs various signal processes for the image pickup signal outputted from the A/D converter 5 and outputs the image pickup signal for which the signal processes have been performed as an image signal to the recording image signal processing circuit 15. The image signal processing circuit 6 further outputs the image signal to the luminance level detector 11.

The recording image signal processing circuit 15 includes a storage section 1502. The recording image signal processing circuit 15 produces image data based on the image signal, temporarily stores the image data into the storage section 1502 and outputs the stored image data to a display section formed from a liquid crystal display unit or the like not shown. Or, the recording image signal processing circuit 15 causes the image data to be recorded on a predetermined recording medium (memory device) through an interface not shown.

The recording image signal processing circuit 15 is configured further such that it can perform image processes including an image process equivalent to exposure correction for the image data stored in the storage section 1502.

The luminance level detector 11 extracts a luminance signal of a predetermined image region from the image signal outputted from the image signal processing circuit 6 and detects an integration value of the extracted luminance signal as a luminance level.

The operation section 14 includes a shutter button for performing image pickup and operation switches for performing setting of various image pickup modes, setting of the shutter speed, setting of the numerical aperture of the iris and setting of the gain.

Contents of the various image pickup modes, the shutter speed, the numerical aperture of the iris and the gain set by the operation section 14 are transmitted as electric signals to the exposure control circuit 12.

It is to be noted that the image pickup modes include, for example, a shutter speed priority mode, an iris priority mode, an automatic mode, a portrait mode and so forth.

The shutter speed priority mode is a mode in which the numerical aperture of the iris 2 and the gain of the hold/gain control circuit 4 are set in response to the speed of the electronic shutter set in advance by the image pickup person and the luminance level detected by the luminance level detector 11.

The iris priority mode is a mode in which the numerical aperture of the iris 2 and the gain of the hold/gain control circuit 4 are set in response to the numerical aperture set in advance by the image pickup person and the luminance level detected by the luminance level detector 11.

The automatic mode is a mode in which combinations of the speed of the electronic shutter, the numerical aperture of the iris 2 and the gain of the hold/gain control circuit 4 are set in advance corresponding to the luminance levels and a combination set in advance of the speed of the electronic shutter, the numerical aperture of the iris 2 and the gain of the hold/gain control circuit 4 is set in response to the luminance level detected by the luminance level detector 11.

The portrait mode is a mode in which the numerical aperture of the iris 2 is set to a value substantially equal to an open value thereof so that, when the image pickup lens optical system 1 is focused on the image pickup subject, the background of the image pickup subject may be picked up in an out-of-focus state, that is, the depth of field may be narrow.

The microcomputer 10 includes the exposure control circuit 12 and the device control circuit 13.

The exposure control circuit 12 includes a RAM 1202.

The exposure control circuit 12 stores the set values of the image pickup modes, the shutter speed, the numerical aperture of the iris and gain outputted from the operation section 14 into the RAM 1202.

The exposure control circuit 12 discriminates based on the luminance level supplied thereto from the luminance level detector 11 whether or not appropriate exposure is performed. Then, based on a result of the discrimination, the exposure control circuit 12 arithmetically operates three values of the numerical aperture of the iris 2, the shutter speed of the electronic shutter of the image pickup device 3 and the gain of the hold/gain control circuit 4 which are necessary to perform appropriate exposure. In the following description, the three values of the numerical aperture of the iris 2, the shutter speed of the electronic shutter of the image pickup device 3 and the gain of the hold/gain control circuit 4 are referred to collectively as "exposure amounts".

The exposure control circuit 12 is configured so as to arithmetically operate three control data necessary for the arithmetically operated exposure amounts to be individually reflected on the iris 2, the electronic shutter of the image pickup device 3 and the hold/gain control circuit 4, that is, iris control data, electronic shutter control data and gain control data. The three control data are stored into the RAM 1202 as occasion demands.

The arithmetic operation of the exposure amounts, the iris control data, the electronic shutter control data and the gain control data by the exposure control circuit 12 is performed based on set values for the various image pickup modes, the shutter speed, the numerical aperture of the iris and the gain stored in the RAM 1202 and the luminance level outputted from the luminance level detector 11.

Further, the exposure control circuit 12 is configured also so as to arithmetically operate control data for controlling the numerical aperture of the iris 2 based on the luminance level supplied thereto from the luminance level detector 11 so that no smear may occur with the image pickup device 3 for a period of time of the monitoring mode hereinafter described.

The device control circuit 13 is configured so as to read out the iris control data stored in the RAM 1202 from the RAM 1202 and produce and supply a first control signal S1 based on the iris control data to the iris driving circuit 8.

Further, the device control circuit 13 is configured so as to read out the electronic shutter data stored in the RAM 1202 from the RAM 1202 and produces and supplies a second control signal S2 based on the electronic shutter control data to the timing generation circuit 9.

The device control circuit 13 reads out the gain control data stored in the RAM 1202 from the RAM 1202 and produces and supplies a third control signal S3 based on the gain control data to the hold/gain control circuit 4. Thus, the hold/gain control circuit 4 is configured such that the gain thereof is controlled based on the third control signal S3.

The iris driving circuit 8 is configured so as to supply a driving signal to the iris driving section 7 based on the first control signal S1 so that the iris driving section 7 may control the numerical aperture of the iris 2.

The timing generation circuit 9 is configured so as to supply a timing signal to the image pickup device 3 based on the second control signal S2 thereby to control the shutter speed of the electronic shutter of the image pickup device 3.

Now, operation for correction control of the iris by the digital camera 100 having the configuration described above is described.

Figure 2:
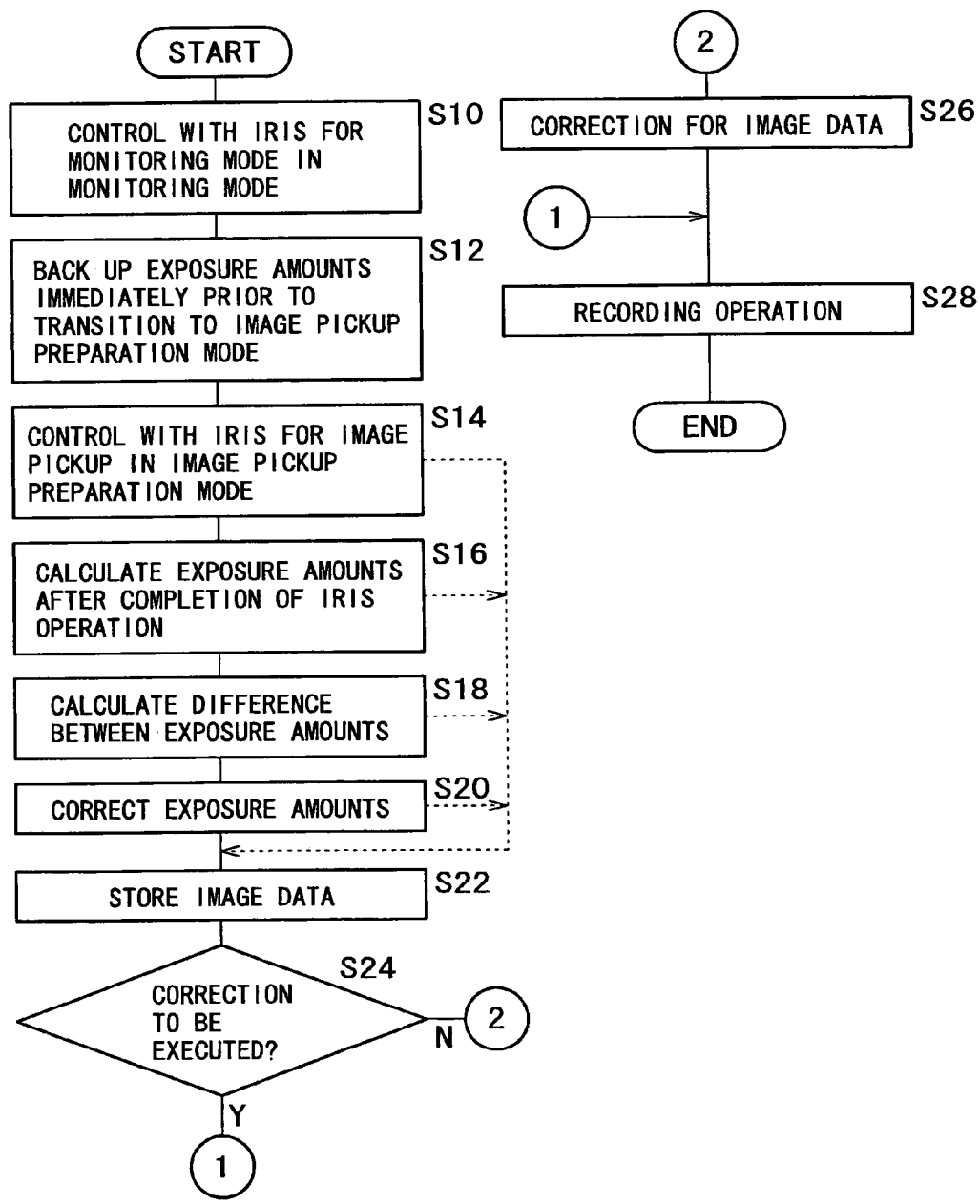
FIG. 2 is a flow chart illustrating operation for correction control of the numerical aperture of an iris.

FIG. 2 is a flow chart illustrating operation for correction control of the numerical aperture of the iris, and FIGS. 3 and 4 are views illustrating operation timings of the components of the digital camera.

First, description is given with reference to FIGS. 3 and 4.

(A) of FIGS. 3 and 4 illustrates the operation modes of the digital camera 100. The operation modes include three modes of the monitoring mode M1, image pickup preparation mode M2 and image pickup mode M3.

The monitoring mode M1 is a state before the shutter button is depressed and a mode in which an image of an image pickup subject is displayed on the display section in order to determine a range of image pickup or composition.

The image pickup preparation mode M2 is a state wherein the shutter button is half-depressed and is a mode in which the exposure control circuit 12 calculates iris control data, electronic shutter control data and gain control data necessary to perform image pickup with appropriate exposure based on the luminance level described hereinabove.

The image pickup mode M3 is a state wherein the shutter button is depressed fully and is a mode in which image data produced by the recording image signal processing circuit based on the image signal outputted from the image signal processing circuit 6 are recorded on a recording medium.

In FIGS. 3 and 4, (B) illustrates setting and operation of the iris 2; (C) illustrates operation of the electronic shutter; (D) illustrates processing operation of the image signal processing circuit 6; and (E) illustrates arithmetic operation of control data by the exposure control circuit 12. In the present example, a time unit in which such operations as described above are performed is indicated by a frame rate of the image pickup signal outputted from the image pickup device 3. To the frame rates, frame rate numbers are applied in order of lapse of time for the convenience of description, and the number of the last frame rate of the image pickup preparation mode M2 is represented by "1".

Further, as seen in FIGS. 3 and 4, the operations of (B), (C), (D) and (E) for the image pickup signal at a certain frame rate are executed in order by one by one frame rate as time passes.

Now, operation for correction control of the iris by the digital camera 100 is described with reference to FIGS. 2 and 3.

First, within the period of the monitoring mode M1, the exposure control circuit 12 arithmetically operates iris control data based on the luminance level supplied thereto from the luminance level detector 11 so that no smear may occur with the image pickup device 3. Consequently, the iris driving circuit 8 and the iris driving section 7 operate based on the arithmetically operated iris control data to successively set the numerical aperture for the iris 2 in a unit of a frame rate, and the numerical aperture is reflected on the iris 2 (step S10).

The exposure control circuit 12 continues to successively arithmetically operate in a unit of a frame rate the exposure amounts for achieving appropriate exposure based on the luminance level supplied thereto from the image signal processing circuit 6 as a result of processing by the image signal processing circuit 6 through the hold/gain control circuit 4 and the A/D converter 5 of the image pickup signal outputted from the image pickup device 3 as an image of the image pickup subject is fetched by an operation of the electronic shutter of the image pickup device 3, the numerical aperture corresponding to the exposure amounts and iris control data corresponding to the numerical aperture, the shutter speed of the electronic shutter and electronic shutter control data corresponding to the shutter speed, and the gain and gain control data corresponding to the gain.

The exposure amounts arithmetically operated correspond to the various image pickup modes (shutter speed priority mode, iris priority mode, portrait mode and so forth) described hereinabove.

Then, if the shutter button is half-depressed, then the image pickup preparation mode M2 is entered, and the exposure control circuit 12 stores (backs up) exposure amounts E1 for achieving appropriate exposure corresponding to the frame rate number "1" immediately prior to the half-depression of the shutter button into the RAM 1202 as seen in (E) of FIG. 3 (step S12).

Then, the exposure control circuit 12 supplies iris control data of the numerical aperture corresponding to the exposure amounts E1 stored in the RAM 1202 at a timing of the frame rate number "5" after the storage of the exposure amounts E1 into the RAM 1202. Consequently, the iris driving section 7 sets the numerical aperture to the iris 2.

Since the iris 2 requires operation time, for example, for 1 frame rate, the numerical aperture corresponding to the iris control data is reflected on the iris 2 at the timing of the next frame rate number "6" (step S14). In other words, a numerical aperture different from the numerical aperture set within the period of the monitoring mode M1 is reflected on the iris. 2.

Here, the numerical aperture actually reflected on the iris 2 includes a hysteresis error and a dispersion error originating from the mechanical operation of the iris 2 with respect to the numerical aperture of the exposure amounts E1 arithmetically operated at step S12.

Further, the exposure control circuit 12 supplies electronic shutter control data and gain data corresponding to the exposure amounts E1 stored in the RAM 1202 to the device control circuit 13 at the timing of the frame rate number "5" after the storage of the exposure amounts E1 into the RAM 1202 as seen in (B) of FIG. 3. Consequently, the shutter speed of the electronic shutter and the gain are set.

After the numerical aperture of the iris 2, the shutter speed and the gain are set in this manner, fetching of the image pickup subject image by the image pickup device 3 is performed as indicated by the frame rate number "6" of (D) of FIG. 3.

Thereafter, the exposure control circuit 12 arithmetically operates exposure amounts E2 for achieving appropriate exposure based on the luminance level corresponding to the frame rate number "6" at which the numerical aperture is reflected on the iris 2 as seen in (E) of FIG. 3 (step S16).

Then, the exposure control circuit 12 arithmetically operates the difference between the exposure amounts E1 backed up in the RAM 1202 and the exposure amounts E2 arithmetically operated at step S16 (step S18). In other words, the exposure control circuit 12 arithmetically operates the difference between the numerical aperture (first numerical aperture) of the iris 2 depending upon the exposure amounts E1 and the numerical aperture (second numerical aperture) of the iris 2 depending upon the exposure amounts E2.

Since the numerical aperture of the iris 2 depending upon the exposure amounts E2 arithmetically operated at step S16 includes a hysteresis error and a dispersion error as described hereinabove, the difference between the exposure amounts E1 and E2 obtained at step S18, that is, the difference between the numerical apertures, corresponds to the hysteresis error and the dispersion error of the iris 2.

Here, the exposure control circuit 12 arithmetically operates a correction value for the shutter speed of the electronic shutter necessary to correct the difference between the numerical aperture of the iris 2 depending upon the exposure amounts E1 and the numerical aperture of the iris 2 depending upon the exposure amounts E2 obtained at step S18 at the timing of the frame rate number "6" of (E) of FIG. 3. Then, the exposure control circuit 12 performs only correction of the shutter speed from among the exposure amounts E2 at the timing of the frame rate number "9" of (C) of FIG. 3 corresponding to the frame rate next to the frame rate number "6" of (E) of FIG. 3, and performs setting of the pertaining components with the corrected exposure amounts E2. In particular, the exposure control circuit 12 performs setting of the numerical aperture of the iris 2, the shutter speed of the image pickup device 3 and the gain of the hold/gain control circuit 4 (step S20). Further, the numerical aperture of the iris 2, the shutter speed of the image pickup device 3 and the gain of the hold/gain control circuit 4 set here are fixed for the period of time for which the shutter button is kept half-depressed, that is, for the period of time of the image pickup preparation mode M2.

Then, if the shutter button is depressed fully at a timing later than the frame rate number (9) of (C) of FIG. 3, then the image pickup mode M3 is entered, and the image pickup subject image is fetched by the image pickup device 3 based on the exposure amounts E2 from among the shutter speed has been corrected. Then, the image signal outputted from the image signal processing circuit 6 is temporarily stored as image data into the storage section 1502 by the recording image signal processing circuit 15 (step S22).

Then, the exposure control circuit 12 discriminates whether or not correction of the exposure amounts at step S20 has been performed (step S24).

Then, if the result of discrimination at step S24 is affirmative ("Y"), then the image data stored in the storage section 1502 of the recording image signal processing circuit 15 are recorded on the recording medium (step S28).

Subsequently, a case wherein the discrimination result at step S24 is negative ("N") is described. The case wherein it is discriminated at step S24 that correction of the exposure amounts has not been performed corresponds to a case wherein, since the shutter button is depressed fully before a sufficient period of time elapses after the shutter button is half-depressed at step S12, the image pickup mode M3 is entered and image pickup is performed before all of the steps S14 to S20 are completed as indicated by broken lines in FIG. 2. In other words, image pickup is performed before correction of the numerical aperture of the iris 2 is performed.

In this instance, the recording image signal processing circuit 15 performs a correction process for the image data stored in the storage section 1502 as described below (step S26).

In the following, particular operation regarding step S26 is described with reference to FIG. 4.

The operation up to the timing of the frame rate number "6" in the image pickup preparation mode M2 is similar to that of FIG. 3, and setting of the numerical aperture of the iris 2 is completed at the timing of the frame rate number "6" as seen in (B) of FIG. 4. Here, the shutter button is fully depressed to enter the image pickup mode M3.

Accordingly, fetching or image pickup of the image pickup subject image by the image pickup device 3 is performed at the timing of the frame rate number "6" as seen in (C) of FIG. 4, and the image signal outputted from the image signal processing circuit 6 is temporarily stored as image data into the storage section 1502 by the recording image signal processing circuit 15.

Then, the exposure control circuit 12 arithmetically operates the exposure amounts E2 for achieving appropriate exposure based on the luminance level corresponding to the frame rate number "6" as seen from (E) of FIG. 4.

Then, the exposure control circuit 12 arithmetically operates the difference between the exposure amounts E1 backed up in the RAM 1202 and the exposure amounts E2. In particular, the exposure control circuit 12 arithmetically operates the difference between the numerical aperture of the iris 2 depending upon the exposure amounts E1 and the numerical aperture of the iris 2 depending upon the exposure amounts E2.

Here, the exposure control circuit 12 arithmetically operates a correction value for an image process necessary to correct the difference between the numerical aperture of the iris 2 depending upon the exposure amounts E1 and the numerical aperture of the iris 2 depending upon the exposure amounts E2 by an image process and supplies the correction value to the recording image signal processing circuit 15.

The recording image signal processing circuit 15 executes an image process corresponding to the exposure correction for the image data (first image data) stored in the storage section 1502 based on the correction value.

Consequently, the image data are corrected so as to become image data (second image data) equivalent to those obtained by image pickup with appropriate exposure.

Then, the image data stored in the storage section 1502 of the recording image signal processing circuit 15 are recorded on the recording medium (step S28).

It is to be noted that, in the present embodiment, the hold/gain control circuit 4 forms the gain control means in the claims and the luminance level detector 11 forms the luminance level detection means in the claims. Further, the exposure control circuit 12 and the device control circuit 13 form the exposure amount arithmetic operation means and the shutter speed correction means in claims 1 to 3. Further, the A/D converter 5, image signal processing circuit 6 and recording image signal processing circuit 15 form the image data production means in the claims, and the recording image signal processing circuit 15 forms the image processing means in the claims.

As described in detail above, according to the present embodiment, a first numerical aperture necessary to perform image pickup with appropriate exposure is arithmetically operated based on the luminance level of an image pickup signal outputted from the image pickup device 3, that is, an image signal. Then, after the first numerical aperture is set to the iris 2, a second numerical aperture necessary to perform image pickup with appropriate exposure is arithmetically operated based on the luminance level detected by the luminance level detector. Further, a correction amount for the shutter speed necessary to perform image pickup with appropriate exposure is arithmetically operated based on the difference between the first numerical aperture and the second numerical aperture. Thereafter, the shutter speed of the electronic shutter of the image pickup device 3 is corrected based on the correction amount for the shutter speed.

Accordingly, a hysteresis error and a dispersion error which appear when the iris 2 operates can be corrected with the shutter speed of the electronic shutter of the image pickup device 3. Since the shutter speed of the electronic shutter can be controlled with a high degree of accuracy, this is advantageous in improvement of the exposure accuracy.

Further, since it is not necessary to perform operation of the iris 2 from one direction in order to remove the hysteresis of the iris 2, the operation time of the iris 2 can be reduced, and this is advantageous in reduction of the shutter lag.

Further, since the shutter speed of the electronic shutter is corrected, an image process for the picked up image data is not performed. This is advantageous in suppression of the degradation of image data by the correction.

Further, since the numerical aperture of the iris 2 is set so as to be substantially equal to its open value in the portrait mode or the like from among the image pickup modes, the numerical aperture of the iris 2 varies by a great amount upon transition from the monitoring mode to the image pickup preparation mode. Accordingly, in such an instance, also the error of the numerical aperture arising from the operation of the iris 2 becomes great. However, according to the present embodiment, since also such an error of the numerical aperture as just described is detected with certainty and used for correction of exposure, the accuracy in exposure can be improved remarkably in any image pickup mode in which the error of the numerical aperture of the iris 2 is likely to become great.

It is to be noted that, in the present embodiment, the correction amount for the shutter speed necessary to perform image pickup with appropriate exposure is arithmetically operated based on the difference between the first numerical aperture and the second numerical aperture by the processes at steps S18 and S20 of FIG. 2 and the shutter speed of the electronic shutter of the image pickup device 3 is corrected based on the correction amount for the shutter speed. Instead, however, it is possible to arithmetically operate the correction amount for the gain of the hold/gain control circuit 4 necessary to perform image pickup with appropriate exposure based on the difference between the first numerical aperture and the second numerical aperture using the fourth exposure amount arithmetic operation means and correct the gain of the hold/gain control circuit 4 based on the correction amount for the gain using the gain correction means. Also in this instance, similar effects to those described above can be anticipated.

In this instance, since the gain of the image pickup signal is corrected, the S/N ratio of the image pickup signal degrades a little when compared with that of the embodiment described above. However, since an image process for the picked up image data is not performed, this is advantageous in suppression of the degradation of the image data by the correction.

Further, in this instance, the fourth exposure amount arithmetic operation means and the gain correction means are formed from the exposure control circuit 12 and the device control circuit 13.

It is to be noted that the assignee of the present patent application has already proposed such a technique as described below as an image quality correction method which uses a solid-state image pickup device (Japanese Patent Application No. 2001-307921 (paragraph number 0023, FIGS. 1 and 2)).

In particular, an image signal read out from the solid-state image pickup device is temporarily stored, and then the stored image signal is read out and predetermined detection is performed for the image signal. Then, the stored image signal is read out again, and a predetermined signal process for correction of the picture quality is performed for the image signal read out again based on the detection data by the predetermined detection.

According to the technique, an image signal as an analog signal read out from the solid-state image pickup device is temporarily stored after pre-processes including a conversion process into a digital signal by an A/D conversion process and various other signal processes are performed for the image signal. Therefore, when compared with the image signal as an analog signal immediately after read out from the solid-state image pickup device, the temporarily stored image signal cannot avoid decrease of the information amount. Accordingly, signal processes are performed for such a degraded image signal as just described, and also the image data obtained from the image signal cannot avoid decrease of the information amount.

In contrast, where the present embodiment is used to correct the gain when the image signal is amplified by the hold/gain control circuit 4, since the correction of the gain is performed at a stage before the signal processes are performed for the image signal, the present embodiment is advantageous in that it does not give rise to such deterioration of a signal or decrease of the information amount of image data as in the related art.

As described above, the digital camera of the present invention is advantageous when it is tried to achieve reduction of the shutter lag required before an image pickup signal is fetched after the shutter button is depressed and achieve improvement of the accuracy in exposure.

The invention claimed is:

1. A digital camera comprising:
an image pickup lens optical system;
an iris for controlling a numerical aperture of a light path of said image pickup lens optical system;
an image pickup device for detecting an image pickup subject formed by said image pickup lens optical system in an interlocking relationship with an operation of an electronic shutter and outputting an image pickup signal;
gain control means having a controllable gain for amplifying the image pickup signal;
luminance level detection means for detecting a luminance level based on the image pickup signal;
first exposure amount arithmetic operation means for arithmetically operating a numerical aperture of said iris necessary to perform image pickup with a first appropriate exposure as a first numerical aperture based on the luminance level detected by said luminance level detection means;
second exposure amount arithmetic operation means for arithmetically operating another numerical aperture of said iris necessary to perform image pickup with a second appropriate exposure as a second numerical aperture based on the luminance level detected by said luminance level detection means after the first numerical aperture is set to said iris;
third exposure amount arithmetic operation means for arithmetically operating a correction amount for the shutter speed necessary to perform image pickup with appropriate exposure based on a difference between the first numerical aperture and the second numerical aperture; and
shutter speed correction means for correcting the shutter speed of said electronic shutter of said image pickup device based on the correction amount for the shutter speed.

2. A digital camera according to claim 1, further comprising:
image data production means for producing image data based on the image pickup signal; and
image processing means for performing an image process for the image data, wherein
when the correction of the shutter speed of said electronic shutter of said image pickup device by said shutter speed correction means is not executed, when a first image data is produced by said image data production means in a state wherein the first numerical aperture is set to said iris, said image processing means produces second image data equivalent to that produced when image pickup is performed with appropriate exposure by performing the image process for the first image data based on the difference between the first numerical aperture and the second numerical aperture.

3. A digital camera according to claim 2, wherein said digital camera further comprises storage means for temporarily storing the image data outputted from said image data production means, and the image process for the image data by said image processing means is performed for the image data stored in said storage means.

4. A digital camera according to claim 1, characterized in that said gain control means amplifies the image pickup signal supplied thereto from said image pickup device as an analog signal.

* * * * *